(12) United States Patent
Luce

(10) Patent No.: US 8,074,508 B2
(45) Date of Patent: Dec. 13, 2011

(54) DEVICE FOR MECHANICALLY FASTENING A TYRE SENSOR TO A RIM

(75) Inventor: Dominique Luce, Bordes de Riviere (FR)

(73) Assignee: LDL Technology, Ramonville Saint Agne ( * ) Notice: Subject to any disclaimer, the term of this patent is extended or adjusted under 35 U.S.C. 154(b) by 199 days.

(21) Appl. No.: 12/446,572

(22) PCT Filed: Sep. 18, 2007

(86) PCT No.: PCT/FR2007/051958
§ 371 (c)(1),
(2), (4) Date: May 12, 2009

(87) PCT Pub. No.: WO2008/050013
PCT Pub. Date: May 2, 2008

(65) Prior Publication Data
US 2011/0000293 A1   Jan. 6, 2011

(30) Foreign Application Priority Data

Oct. 23, 2006   (FR) ..................................... 06 54455

(51) Int. Cl.
*B60C 23/02* (2006.01)
(52) U.S. Cl. ........................................ 73/146.8; 73/146
(58) Field of Classification Search .................. None
See application file for complete search history.

(56) References Cited

U.S. PATENT DOCUMENTS

| | | | | |
|---|---|---|---|---|
| 5,956,820 | A * | 9/1999 | Albinski | 24/455 |
| 5,977,870 | A * | 11/1999 | Rensel et al. | 340/447 |
| 6,722,409 | B1 * | 4/2004 | Martin | 152/427 |
| 6,805,000 | B1 | 10/2004 | Sheikh-Bahaie | |
| 6,895,810 | B2 * | 5/2005 | Saheki et al. | 73/146.8 |
| 7,886,589 | B2 * | 2/2011 | Capdepon et al. | 73/146.8 |
| 2004/0155763 | A1 | 8/2004 | Lin et al. | |
| 2005/0087007 | A1 | 4/2005 | Uleski | |

FOREIGN PATENT DOCUMENTS

| | | |
|---|---|---|
| DE | 201 10 759 U1 | 2/2002 |
| DE | 101 42 354 A1 | 3/2002 |
| FR | 2 876 322 A1 | 4/2006 |

OTHER PUBLICATIONS

International Search Report, Mar. 10, 2008, from International Phase of the instant application.
English Translation of the Written Opinion of the International Search Authority, May 5, 2009, from International Phase of the instant application.
English Translation of International Preliminary Report on Patentability Chapter I, May 5, 2009, from International Phase of the instant application.

\* cited by examiner

*Primary Examiner* — Lisa Caputo
*Assistant Examiner* — Jermaine Jenkins
(74) *Attorney, Agent, or Firm* — Jackson Patent Law Office

(57) ABSTRACT

The invention relates to a device (D) for fastening an electronic detection unit (100) for tires to a rim (J), this unit being of the type which is fastened to the valve (200), which valve comprises a part (210) outside the rim and a part (220) inside the rim, said device consisting of a connection module (300) connected on the one hand to the inner part (220) of the valve (200) and on the other hand to a preformed receptacle (400) for accommodating said electronic unit (100), distinguished in that said receptacle (400, 400a, 400b) forms an accommodation volume which is open on the tire tread side. Applications: detection unit fastened to the vehicle wheels.

8 Claims, 8 Drawing Sheets

DEVICE FOR MECHANICALLY FASTENING A TYRE SENSOR TO A RIM

FIELD OF THE INVENTION

The present invention relates to the field of sensors housed in tires and particularly to adaptations used to receive and hold same in position under optimal position.

DESCRIPTION OF THE PRIOR ART

There exist, at the present time, pressure and temperature sensors that are sufficiently compact to be housed in a tire such as those fitted on a motor vehicle.

The mechanical attachment modes of said sensors are varied and make use of three main techniques which are:
- strapping of a housing containing the electronics of the sensors on the rim, the housing being pressed into the rim base by a belt most frequently made of metal, the tire thus containing said strapping and said electronics,
- attachment of a housing directly on a wall of the rim by boring or gluing of the rim,
- attachment of a housing via the valve hole and the valve itself.

The majority of solutions using the latter technique are subject to tangential stress occurring during acceleration and deceleration of the vehicles to form a major source of fatigue for the seal involved in fitting.

A solution to this problem is described in the document FR 2876322 which proposes an assembly of a detection housing inside a tire of the type attached to the body of a valve and comprising the following elements:
- a detection housing receiving the detection components,
- a valve body,
- a seal type tightness means ensuring the tightness between the valve body and the rim,
- a means for holding the valve body in position on the rim, preformed for this purpose with a connection orifice,
- a connection module of the detection housing with the valve body,
- at least one of the elements of said assembly, apart from the tightness means, being preformed so that a part of this element enters the connection orifice so as to rest thereon when the assembly is subjected to tangential stress.

The applicant observed that this type of assembly involved the drawback of requiring a special valve suitable for the required assembly. Another drawback is that the electronic housing is rendered integral to the valve and can only be replaced or undergo a maintenance operation if the valve itself is disassembled from the rim.

DESCRIPTION OF THE INVENTION

On the basis of this statement, the applicant conducted research intended to attach this type of electronic housing on standard valves. Another aim of this research was to render the electronic housing independent from the valve to facilitate maintenance or replacement operations.

This research resulted in the design and production of a device for the attachment on a rim of an electronic detection housing for tires of the type attached to the valve which comprises one part outside the rim and one part inside the rim, said device constituted by a connection module connected, on one hand, to the inner part of the valve and, on the other, to a receptacle preformed to receive said electronic housing, characterised in that said receptacle forms a reception volume open on the side of the tire tread which facilitates the access and operation thereof, while preventing the creation of a Faraday cage between the walls of the rim and the receptacle.

In addition, this feature is particularly advantageous in that it allows the use of a standard valve for the attachment of the housing. In addition, according to the aims of the invention, the housing becomes integral to the receptacle only, is no longer involved in the assembly on the rim and is no longer attached directly to the valve. Therefore, it is no longer necessary to remove the valve to arrange the housing. In this way, only the receptacle and the connection module are liable to be modified according to the applications. The valve used in the attachment device of the invention may thus remain the original valve.

In order to facilitate the detachability of the housing with respect to the receptacle thereof, said receptacle and the housing are preformed to produce a sliding joint.

The applicant envisaged several configurations for the device according to the invention. According to a first configuration, the connection module and the receptacle are made of the same part. According to a non-limitative embodiment, said receptacle is then constituted by a sheet of metal preformed essentially with an opening wherein the valve is inserted during assembly, the valve head resting on the edges of said opening. This opening forms said connection module.

According to second configuration, the connection module is constituted by one or more independent elements of the receptacle. According to a non-limitative embodiment, said connection module is then constituted by a hollow cylinder comprising an inner shoulder and an outer shoulder, the valve being inserted in the cylinder and said valve head resting on the inner shoulder for the purposes of attaching the connection part on the rim, and the receptacle being inserted on the cylinder by means of an orifice provided for this purpose and resting with the edges of said orifice on the outer shoulder.

According to another embodiment of said second configuration, said connection module is essentially constituted by a nut comprising an inner threaded bore screwed onto the valve for the purposes of attaching the connection module on the rim, said nut being preformed with an outer shoulder, the receptacle being preformed with an orifice wherein the nut is inserted such that the outer shoulder rests on the edges of the orifice.

According to another particularly advantageous feature, an attachment flange is attached to said receptacle to ensure that the housing is held in position.

According to another particularly advantageous feature, the housing volume is preformed on the side thereof oriented towards the valve head so as to adopt an offset shape to free, once the housing has been fitted, the volume around the valve head.

The fundamental concepts of the invention described above in the most basic form thereof, other details and features will emerge more clearly on reading the description hereinafter with reference to the appended figures, giving as a non-limitative example, an embodiment of the device according to the invention.

DESCRIPTION OF PREFERRED EMBODIMENTS

Figure 1:
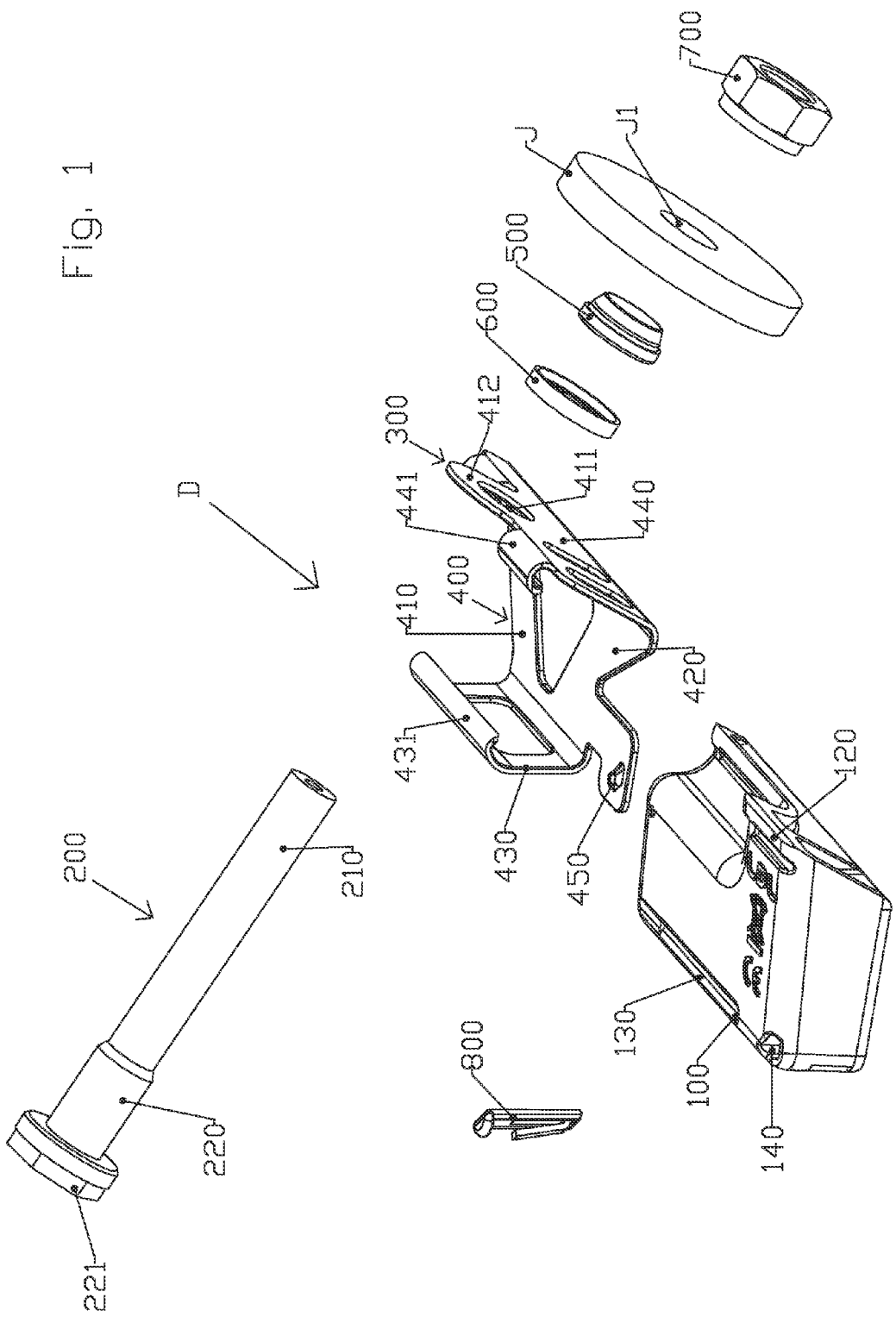
FIG. 1 is a schematic drawing of an exploded perspective view of an embodiment of the device according to the invention.
Figure 2:
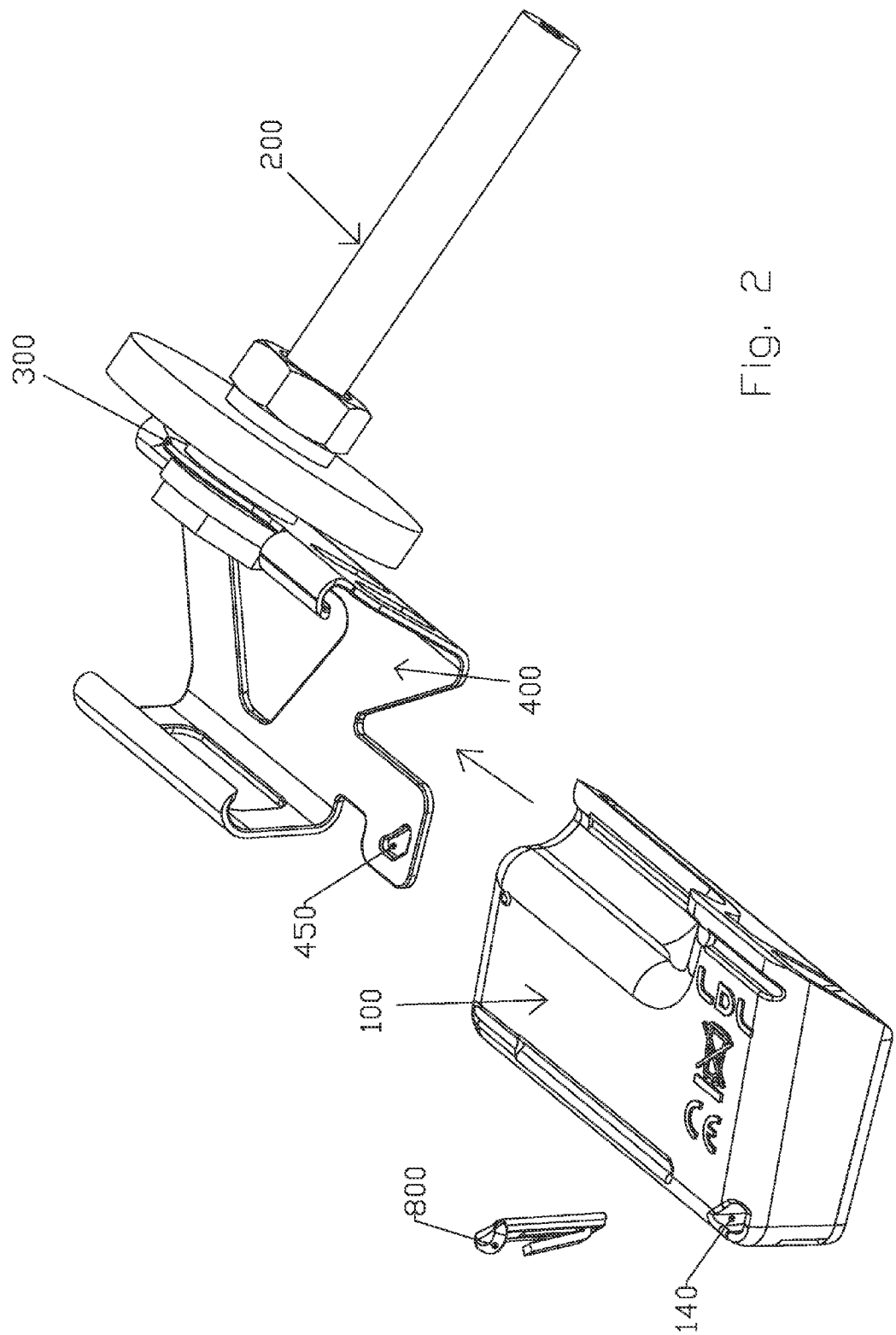
FIG. 2 is a schematic drawing of a perspective view of the device in FIG. 1 showing the engagement of the housing in the receptacle.
Figure 3:
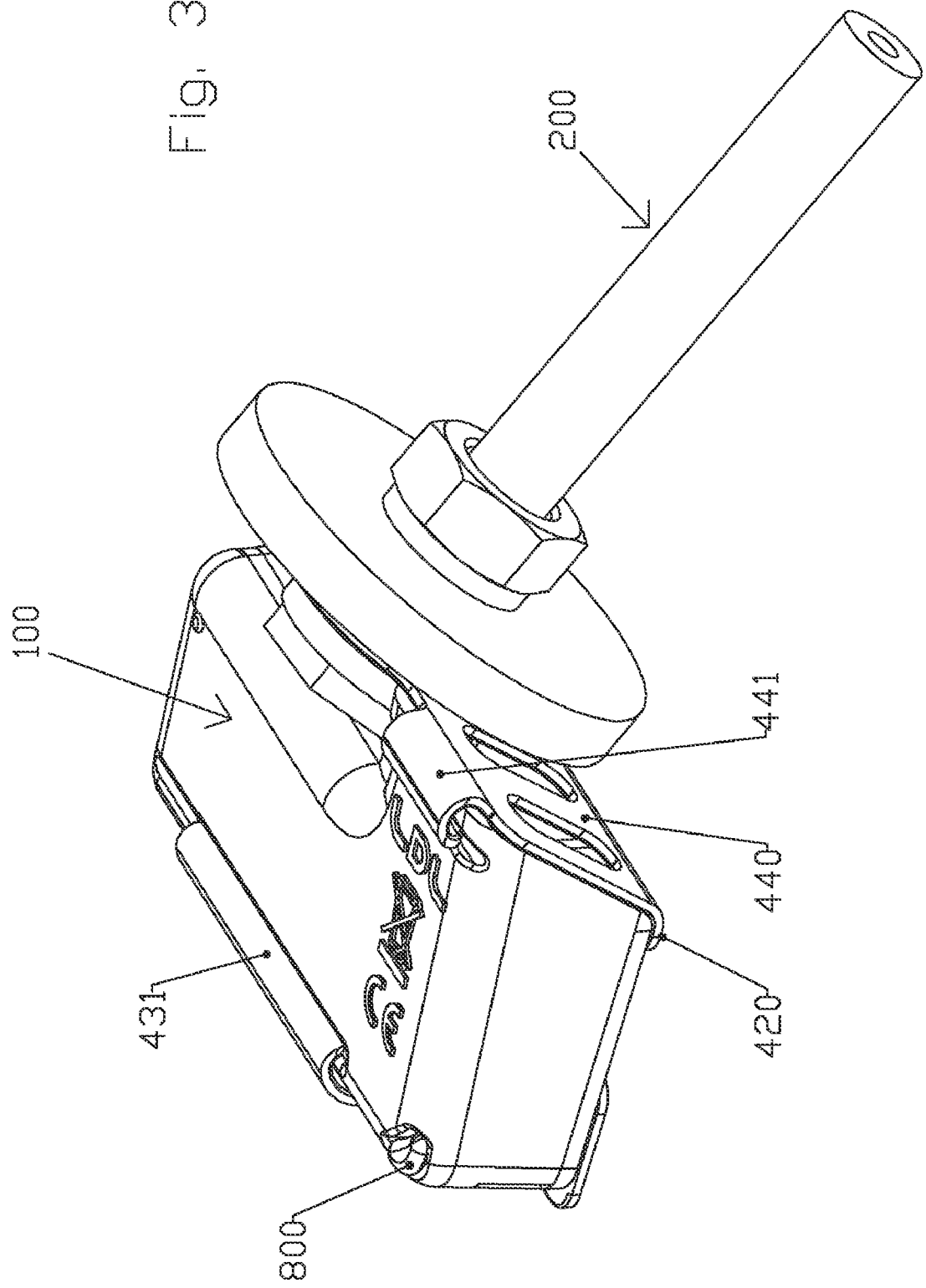
FIG. 3 is a schematic drawing of a perspective view of the device in FIG. 1 showing the housing positioned in the receptacle.
Figure 4:
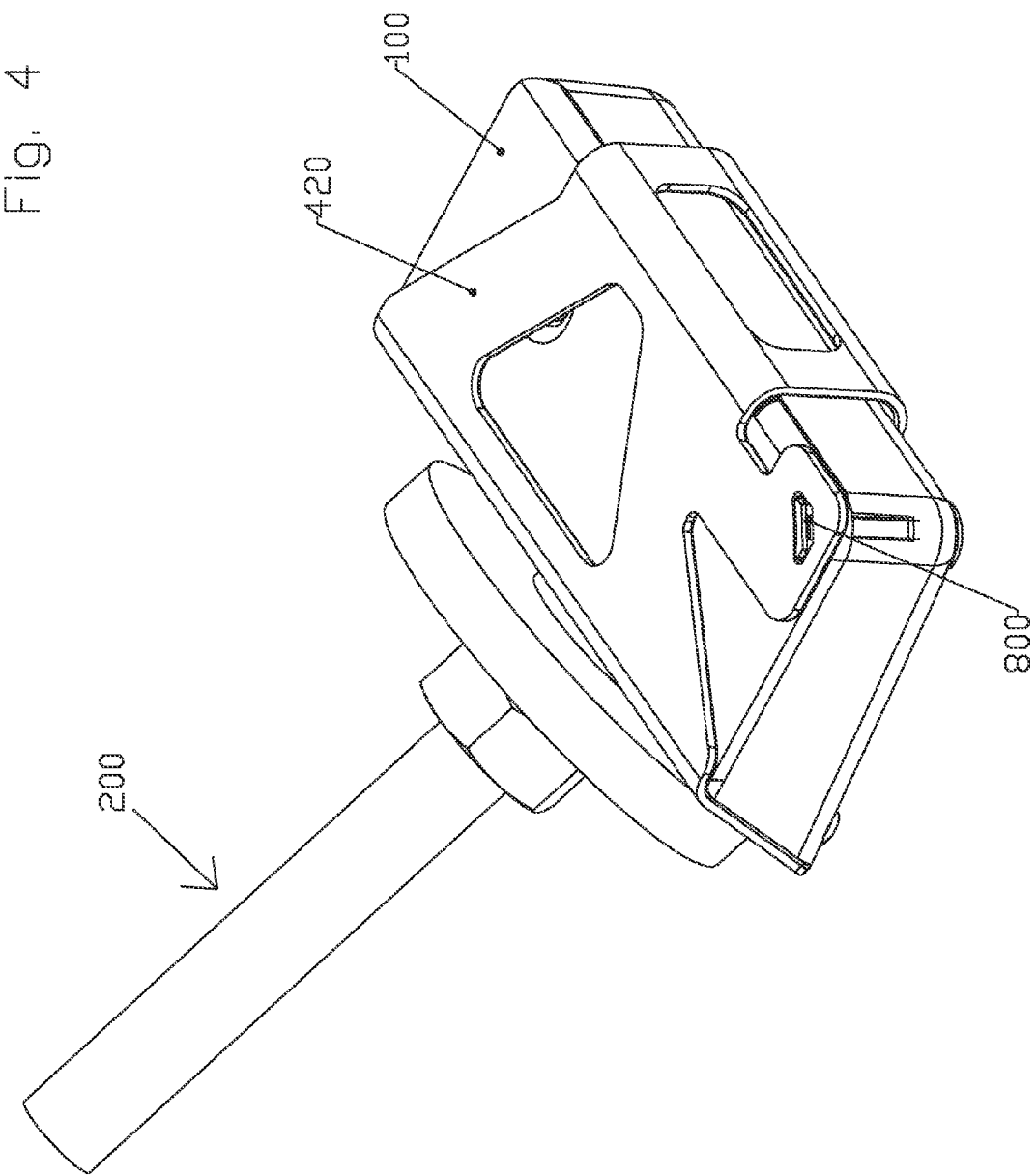
FIG. 4 is a schematic drawing of a perspective bottom view of the device in FIG. 1, the housing being positioned in the receptacle.
Figure 5:
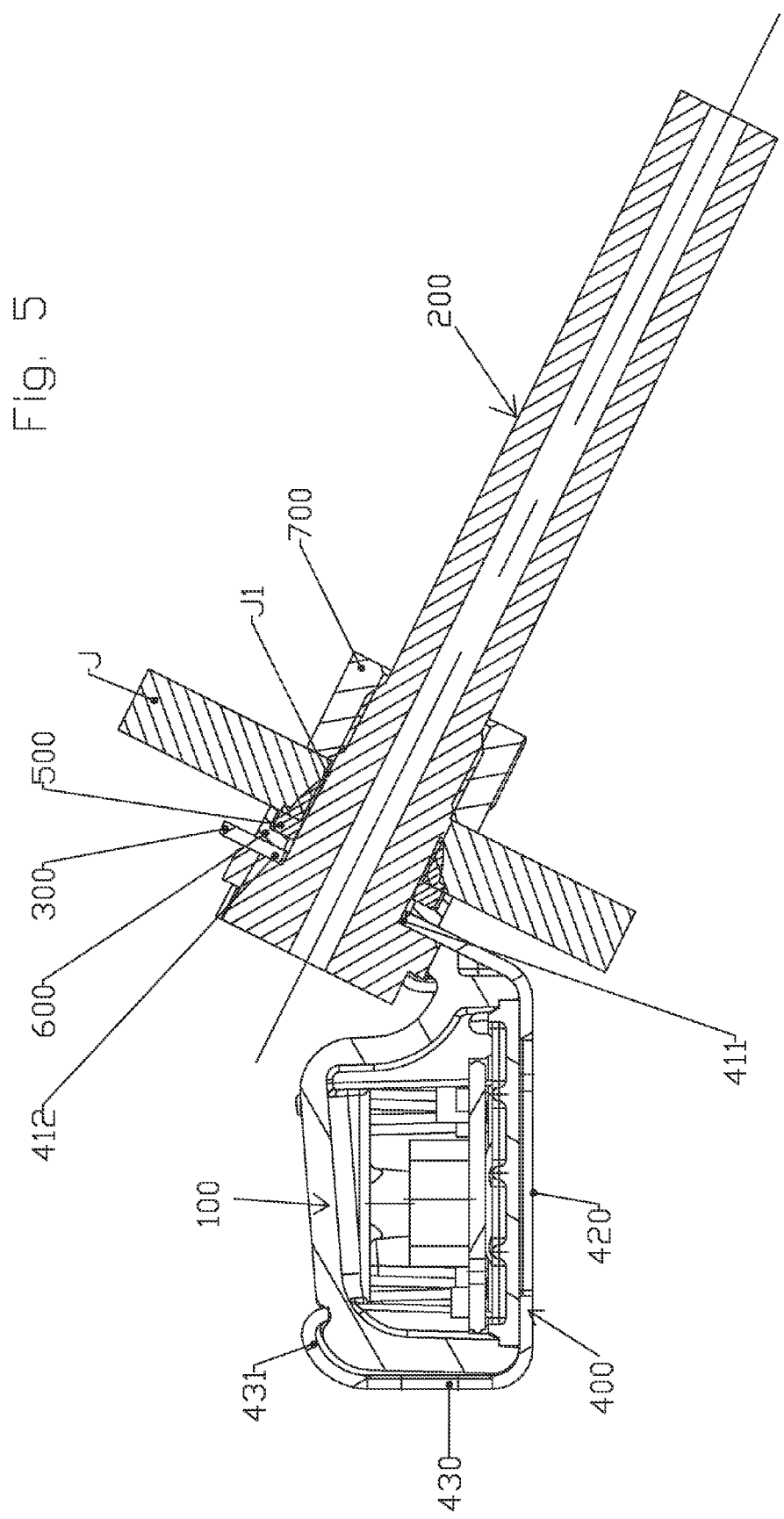
FIG. 5 is a schematic drawing of a cross-sectional view of the device in FIG. 1.

As illustrated in the drawing in FIGS. 1 and 5, the device referenced D overall performs the attachment on the rim J (partially represented herein by a washer) of an electronic detection housing 100 for tires of the type being attached to the valve 200 which comprises, once fitted, a part 210 outside the rim and a part 220 inside the rim comprising a head 221.

According to the invention, the device D is constituted by a connection module 300 connected, on one hand, to the inner part 220 of the valve 200 and, on the other, to a receptacle 400 preformed to receive said electronic housing 100. In this way, the housing is not directly connected to the valve which allows the interchangeability of said housing without removing the valve.

According to the embodiment illustrated, the device also comprises a seal 500 associated with a hollow washer 600 which rests J around the valve hole J1.

As illustrated, said receptacle 400 and the housing 100 are preformed to produce a sliding joint.

According to the invention and according to the embodiment illustrated, said receptacle 400 is constituted by a sheet of metal 410 preformed essentially with an opening 411 wherein the valve 200 is inserted and on the edges 412 whereof the valve head 221 rests, said opening forming said connection part 300. According to the embodiment illustrated, the opening 411 is an orifice produced in the thickness of the sheet of metal 410 and located such that the edge 412 surrounds same completely.

According to the embodiment illustrated, said sheet of metal 410 is provided with a plurality of openings so as to lighten the structure formed, which offers the advantage of reducing stress on the valve 200.

According to a particularly advantageous feature, the thickness of the sheet of metal is sufficiently small so that the threading conventionally used for the assembly of the standard valve 200 can be used. In this way, the device according to the invention does not require any modification of the assembly existing on a standard valve. Indeed, as illustrated in the drawing in FIGS. 1 and 5, the elements of the assembly of a standard valve 200 are constituted by the valve 200 and the nut 700, the device D merely adds a thickness between the inner surface of the rim J and the bearing surface of the valve head 221. This additional thickness is constituted by the height of the washer 600 and the thickness of the sheet of metal.

In spite of the reduced thickness and the different openings made in the metal sheet, the material of the receptacle formed in this way is selected to form a rigid and non-deformable frame to receive the electronic housing.

As illustrated, the volume of housing 100 is preformed on the side oriented towards the valve head 221 so as to adopt an offset shape 110 to prevent the formation of an obstacle at the air inlet or outlet from the head 221 of the valve 200. In order to render the housing 100 completely independent from the valve 200, said receptacle 400 forms a bearing platform 420 for the housing 100, the surface of said platform and the bearing surface for the valve head 221 proposed by the connection part 300 and the respective distance thereof are defined such that the valve head 221 does not come into contact with said housing 100.

According to the embodiment illustrated, the sheet of metal forming the receptacle 100 comprises a plane central part forming the platform 420 on two opposite sides whereof two substantially plane lateral parts 430 and 440 rise to form the sides of the receptacle 400. As illustrated, the ends 431 and 441 of said sides 430 and 440 not connected to the platform 420 are preformed with an internal return to form longitudinal offset volumes with which projecting volumes 120 and 130 of the outer surface of the housing cooperate to form said sliding joint.

As illustrated by the drawings in the figures, to ensure the housing 100 is held in position in the receptacle 400, the housing and the receptacle are each preformed with an orifice 140 and 450 corresponding once the housing is positioned in the receptacle and whereby an attachment pin 800 is positioned. This pin is fastened inside the orifice 140 produced in the housing 100.

According to another embodiment not illustrated, another solution to lock said sliding joint in translation comprises preforming said receptacle 100 on the upper face thereof with an offset shape with which a projecting pin preformed on the lower face of the housing cooperates.

Figure 6:
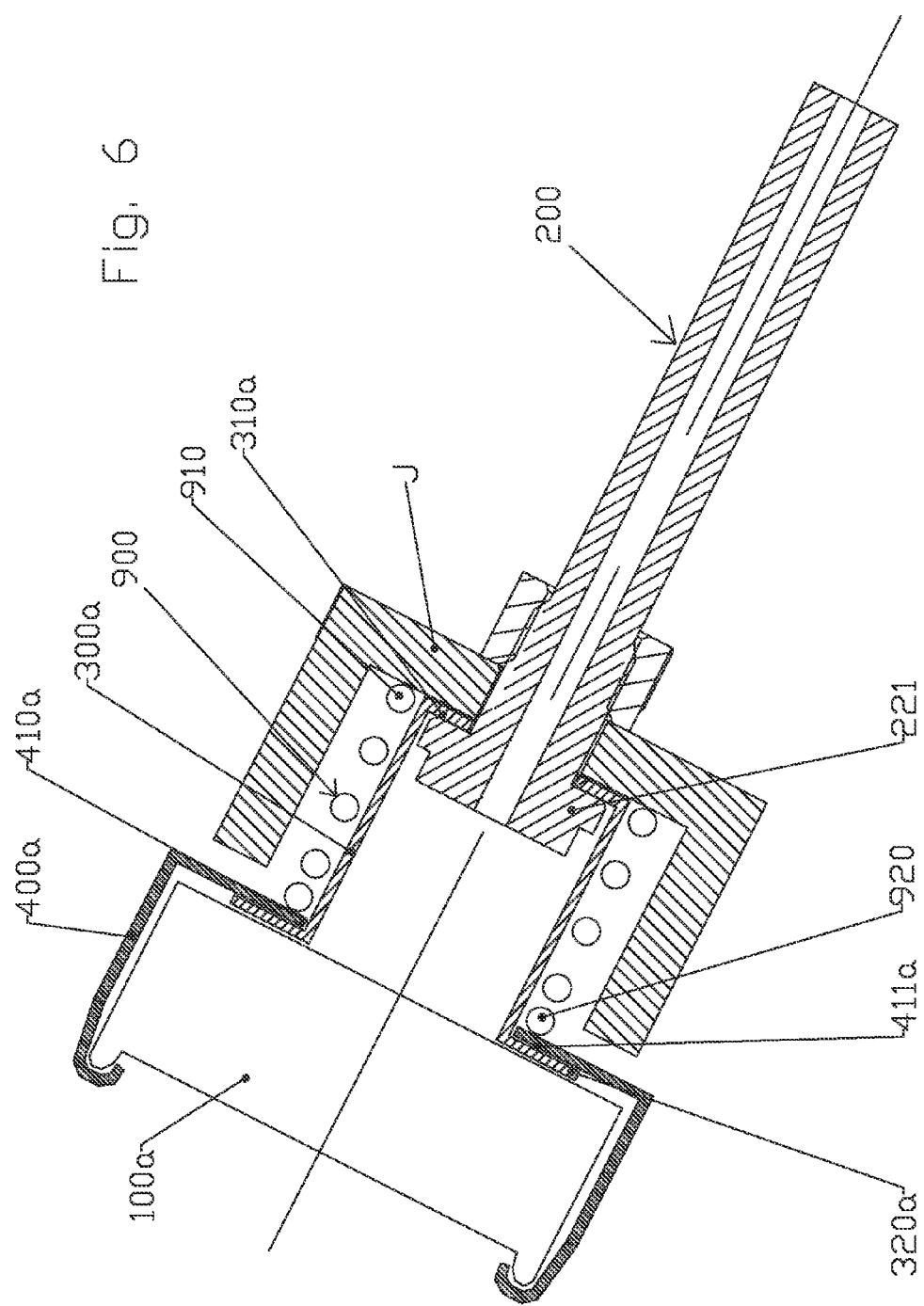
FIG. 6 is a schematic drawing of a cross-sectional view of another embodiment of the device according to the invention.

According to the non-limitative embodiment illustrated by the drawing in FIG. 6, said connection part 300a is an independent part of the receptacle and is constituted by a hollow cylinder comprising an inner shoulder 310a and an outer shoulder 320a, the valve 200 being inserted in the cylinder 300a and said valve head 221 resting on the inner shoulder 310a for the purposes of attaching the connection part on the rim J, and the receptacle 400a being engaged on the cylinder 300a by means of an orifice 410a provided for this purpose and resting with the edges 411a of said orifice 410a on the outer shoulder 320a. The cylinder 300a may then slide in the receptacle 400a.

As illustrated, a compression spring 900 positioned around the connection part 300a comprises one end 910 resting on the rim J and one end 920 resting on the receptacle 400a so as to hold the receptacle 400a in position against the outer shoulder 411a.

Figure 8:
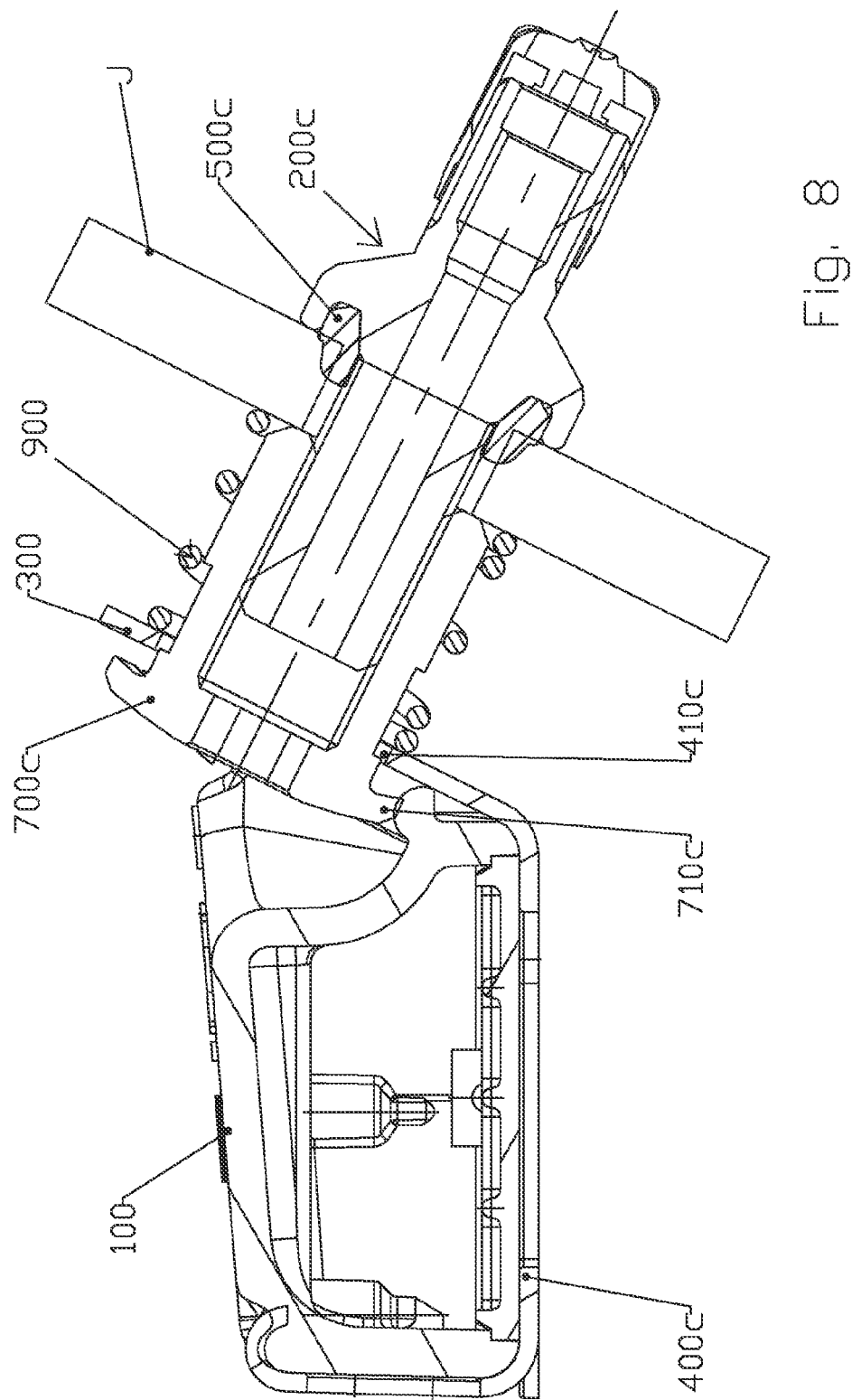
FIG. 8 is a schematic drawing of a cross-sectional view of another embodiment of the device according to the invention.

The embodiment illustrated by the drawing in FIG. 8 also shows a solution wherein the connection module forms an intermediate part essentially constituted by a nut 700c comprising an inner threaded bore screwed onto the valve 200c for the purposes of attaching the connection module on the rim J, said nut being preformed with an outer shoulder 710c, the receptacle 400c being preformed with an orifice 410c wherein the nut 700c is inserted such that the outer shoulder 710c rests on the edges of the orifice 410c. A spring 900 holds, resting on the rim, the edge of the orifice 410c provided in the receptacle 400c against the outer shoulder of the nut 700c.

Figure 7:
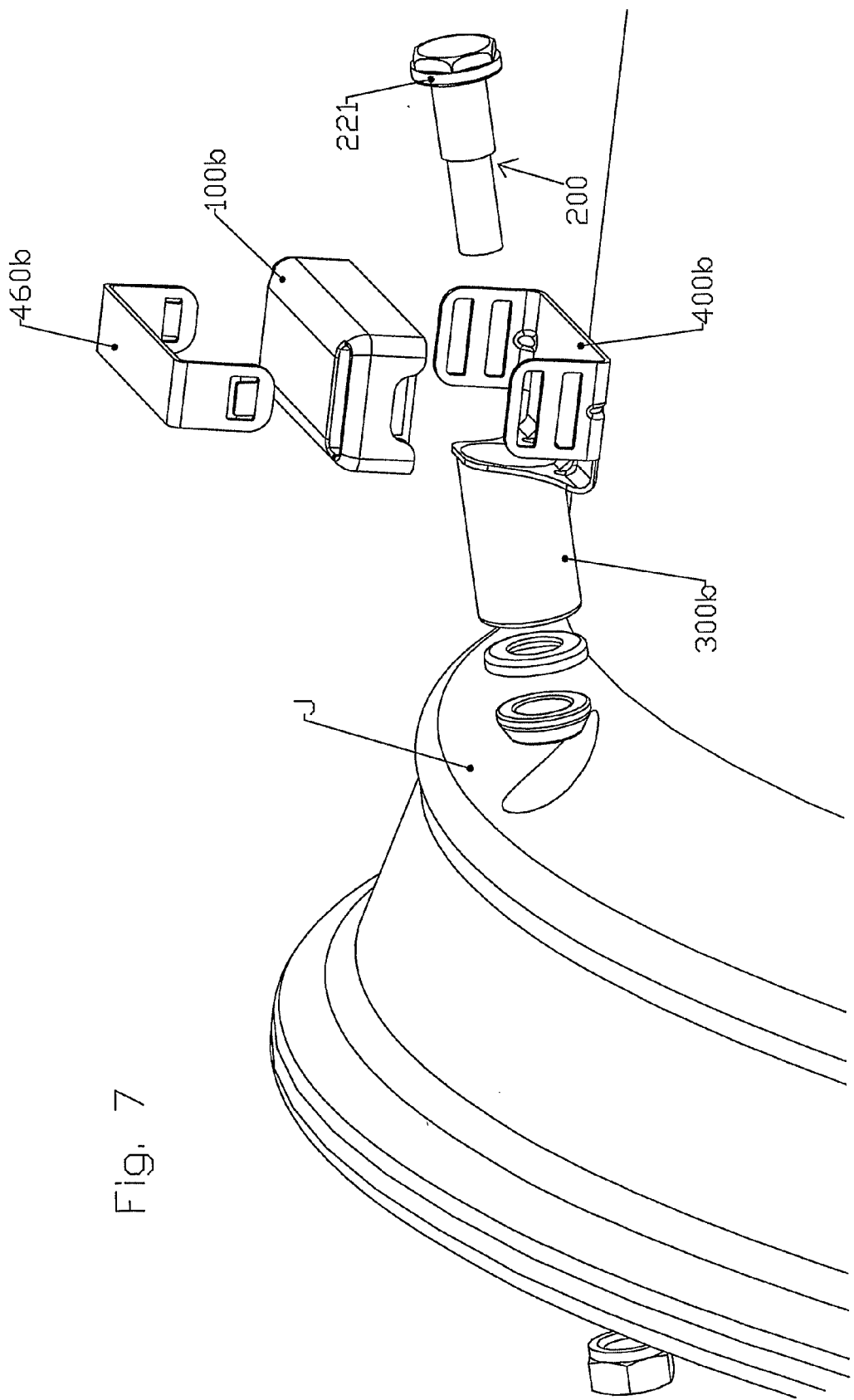
FIG. 7 is a schematic drawing of an exploded perspective view of another embodiment of the device according to the invention.

The embodiment illustrated by the drawing in FIG. 7 represents an alternative embodiment having features of the first and the second embodiments. In this embodiment, the connection part 300b is integral to the receptacle 400b and is constituted by a hollow cylinder comprising an inner shoulder not illustrated, the valve 200 being inserted in the cylinder 300b and said valve head 221 resting on the inner shoulder for the purposes of attaching the connection part 300b on the rim J.

In this embodiment and according to a feature of the invention, an attachment flange 460b is attached to said receptacle 400b to ensure that the housing 100b is held in position in the receptacle 400b. The flange 460b is fastened on the sides of the receptacle 400b.

According to all the embodiments, said receptacle 400 forms an open receiving volume on the side of the tire tread.

It is understood that the device described and represented above has been described and represented with a view to a disclosure rather than a limitation. Naturally, various arrangements, modifications and improvements may be added to the example above, without leaving the scope of the invention.

The invention claimed is:

1. Device for the attachment on a rim of an electronic detection housing for tires of the type attached to the valve which comprises one part outside the rim and one part inside the rim, said device comprising a connection module connected to the inner part of the valve and to a receptacle preformed to receive said electronic housing, characterised in that said receptacle forms a reception volume open on the side of the tire tread, and in that said connection module comprises a hollow cylinder comprising an inner shoulder and an outer shoulder, the valve being inserted in the cylinder and said valve head resting on the inner shoulder for the purposes of attaching the connection part on the rim, and the receptacle being engaged on the cylinder by means of an orifice provided for this purpose and resting with the edges of said orifice on the outer shoulder.

2. Device according to claim 1, characterised in that said receptacle and the housing are preformed to produce a sliding joint.

3. Device according to claim 1, wherein the valve comprises a head, characterised in that said receptacle comprises a sheet of metal preformed with an opening wherein the valve is inserted and on the edges whereof the valve head rests, said opening forming said connection module.

4. Device according to claim 1, characterised in that said connection module comprises a nut comprising an inner threaded bore screwed onto the valve for the purposes of attaching the connection module on the rim, said nut being preformed with an outer shoulder, the receptacle being preformed with an orifice wherein the nut is inserted such that the outer shoulder rests on the edges of the orifice.

5. Device according to claim 1, characterised in that a compression spring comprises one end resting on the rim and one end resting on the receptacle so as to hold the receptacle in position against the outer shoulder.

6. Device according to claim 1, characterised in that said receptacle forms a bearing platform for the housing, the surface of said platform and the bearing surface for the valve head proposed by the connection part) and the respective distance thereof are defined such that the valve head does not come into contact with said housing.

7. Device according to claim 1, characterised in that the housing volume is preformed on the side thereof oriented towards the valve head so as to adopt an offset shape to prevent the formation of an obstacle at the air inlet or outlet from the valve head.

8. Device according to claim 1, characterised in that the housing and the receptacle are each preformed with an orifice corresponding once the housing is positioned in the receptacle and whereby an attachment pin is positioned.

* * * * *